(12) United States Patent
Rapaka et al.

(10) Patent No.: US 10,957,042 B2
(45) Date of Patent: Mar. 23, 2021

(54) AUTO-REFERENCING IN DIGITAL HOLOGRAPHIC MICROSCOPY RECONSTRUCTION

(71) Applicant: Siemens Healthcare GmbH, Erlangen (DE)

(72) Inventors: Saikiran Rapaka, Pennington, NJ (US); Ali Kamen, Skillman, NJ (US); Noha El-Zehiry, Plainsboro, NJ (US); Bogdan Georgescu, Plainsboro, NJ (US); Anton Schick, Velden (DE); Uwe Philippi, Bruckmuehl (DE); Oliver Hayden, Moosburg (DE); Lukas Richter, Hirschaid (DE); Matthias Ugele, Neumarkt (DE)

(73) Assignee: Siemens Healthcare GmbH, Erlangen (DE)

( * ) Notice: Subject to any disclaimer, the term of this patent is extended or adjusted under 35 U.S.C. 154(b) by 474 days.

(21) Appl. No.: 15/750,990

(22) PCT Filed: Sep. 22, 2016

(86) PCT No.: PCT/EP2016/072491
§ 371 (c)(1),
(2) Date: Feb. 7, 2018

(87) PCT Pub. No.: WO2017/050861
PCT Pub. Date: Mar. 3, 2017

(65) Prior Publication Data
US 2018/0232882 A1 Aug. 16, 2018

Related U.S. Application Data

(60) Provisional application No. 62/221,764, filed on Sep. 22, 2015.

(51) Int. Cl.
*G06T 7/00* (2017.01)
*G03H 1/08* (2006.01)
(Continued)

(52) U.S. Cl.
CPC ....... *G06T 7/0014* (2013.01); *G01N 15/1429* (2013.01); *G01N 15/1434* (2013.01);
(Continued)

(58) Field of Classification Search
CPC .............. G03H 1/0866; G03H 1/0443; G03H 2001/0452; G03H 2001/005; G03H 1/16;
(Continued)

(56) References Cited

U.S. PATENT DOCUMENTS 5,760,901 A * 6/1998 Hill ...................... G02B 21/004
356/450
2010/0253986 A1 * 10/2010 Awatsuji .............. G03H 1/0443
359/10
(Continued)

FOREIGN PATENT DOCUMENTS

EP 2230855 A2 9/2010

OTHER PUBLICATIONS

Zhang, Hanqing. Digital holography and image processing methods for applications in biophysics. Diss. Umeå University, 2018. (Year: 2018).*
(Continued)

*Primary Examiner* — Pinalben Patel (57) ABSTRACT

A computer-implemented method for analyzing digital holographic microscopy (DHM) data for hematology applications includes receiving a DHM image acquired using a digital holographic microscopy system. The DHM image comprises depictions of one or more cell objects and background. A reference image is generated based on the DHM
(Continued)

image. This reference image may then be used to reconstruct a fringe pattern in the DHM image into an optical depth map.

14 Claims, 7 Drawing Sheets

(51) Int. Cl.

| | | |
|---|---|---|
| G06K 9/00 | (2006.01) | |
| G06T 7/55 | (2017.01) | |
| G03H 1/04 | (2006.01) | |
| G01N 15/14 | (2006.01) | |
| G06T 7/11 | (2017.01) | |
| G03H 1/00 | (2006.01) | |
| G03H 1/16 | (2006.01) | |
| G06K 9/62 | (2006.01) | |
| G06T 5/00 | (2006.01) | |
| G01N 15/10 | (2006.01) | |

(52) U.S. Cl.
CPC ....... *G01N 15/1475* (2013.01); *G03H 1/0005* (2013.01); *G03H 1/0443* (2013.01); *G03H 1/0866* (2013.01); *G03H 1/16* (2013.01); *G06K 9/0014* (2013.01); *G06K 9/6255* (2013.01); *G06T 5/005* (2013.01); *G06T 7/11* (2017.01); *G06T 7/55* (2017.01); *G01N 2015/1006* (2013.01); *G01N 2015/1454* (2013.01); *G03H 2001/005* (2013.01); *G03H 2001/0452* (2013.01); *G03H 2001/0883* (2013.01); *G03H 2210/55* (2013.01); *G06K 2209/403* (2013.01); *G06T 2207/10056* (2013.01); *G06T 2207/20081* (2013.01); *G06T 2207/30024* (2013.01)

(58) Field of Classification Search
CPC ............. G03H 1/0005; G03H 2210/55; G03H 2001/0883; G06K 2209/403; G06K 9/6255; G06K 9/0014; G06T 2207/10056; G06T 7/55; G06T 2207/30024; G06T 7/11; G06T 7/0014; G06T 5/005; G06T 2207/20081; G01N 2015/1454; G01N 2015/1006; G01N 15/1475; G01N 15/1429; G01N 15/1434
See application file for complete search history.

(56) References Cited

U.S. PATENT DOCUMENTS

| | | | |
|---|---|---|---|
| 2012/0116703 A1* | 5/2012 | Pavillon | G03H 1/0866 702/70 |
| 2015/0269441 A1* | 9/2015 | Mj | G06K 9/00744 382/103 |

OTHER PUBLICATIONS

International Search Report dated Dec. 21, 2016 in corresponding International Application No. PCT/EP2016/072491.
Orzo Laszlo et al., "Advanced background elimination in digital holographic microscopy", Cellular nanoscale networks and their applications (CNNA), Aug. 29, 2012, pp. 1-5.
Tamrin K. F. et al., "An experimental investigation aggregation using digital holographic microscopy", Optics and lasers in engineering, vol. 68, May 1, 2015, pp. 93-103.
Marim Marcio et al., "Compressed sensing applications for biological microscopy", 2010 IEEE Workshop in signal processing system (SIPS 2010), Oct. 6-8, 2010, pp. 216-221.
Scotti Fabio, "Robust segmentation and measurements techniques of white cells in blood microscope images", 2013 IEEE International Instrumentation and measurement technology conference (I2MTC), Apr. 1, 2006, pp. 43-48.
Singh, Amardeep S.G.; Anand Arun et al.: "Lateral shearing digital holographic imaging of small biological specimens", in: Optics Express, 2012, vol. 20, No. 21, pp. 23617-23622.
Thilagavathi M. et al., "An efficient dictionary learning algorithm for 3D medical images denoising based on sadct", Information communication and embedded systems (ICICES), Feb. 21, 2013, pp. 442-447.
D. Comaniciu and P. Meer, Mean Shift: A Robust Approach Toward Feature Space Analysis; IEEE Transactions on Pattern Analysis and Machine Intelligence, vol. 24, No. 5, pp. 603-619.
Du, et al, "Image segmentation and inpainting using hierarchical level set and texture mapping"; Signal Processing 9.4 (2011): pp. 852-863.
Bertalmio, et al. "Image inpainting." Proceedings of the 27th annual conference on Computer graphics and Interactive techniques. ACM Press/Addison-Wesley Publishing Co., 2000.
Goldstein, et al.; Satellite radar interferometry: Two- dimensional phase unwrapping, Radio Science, vol. 23, Issue 4, 1988.
Kim, et al; Wavelet-Based Compressed Sensing Using a Gaussian Scale Mixture Model. IEEE Transactions on Image Processing 21(6); 2012; pp. 3102-3108.
Mairal, et al; Online dictionary learning for sparse coding. In Proceedings of the 26th Annual International Conference on Machine Learning (ICML '09); 2009; ACM, New York, NY, USA, 689-696.
Fukunaga; Introduction to Statistical Pattern Recognition, second ed. Academic Press 1990.

\* cited by examiner

Fig. 6

AUTO-REFERENCING IN DIGITAL HOLOGRAPHIC MICROSCOPY RECONSTRUCTION

CROSS REFERENCE TO RELATED APPLICATIONS

This application claims the benefit of U.S. Provisional Application Ser. No. 62/221,764 filed Sep. 22, 2015 which is incorporated herein by reference in their entirety.

TECHNICAL FIELD

The present disclosure relates generally to methods, systems, and apparatuses related to the use of auto-referencing in digital holographic microscopy (DHM) reconstruction. The techniques described herein may be applied, for example, in measuring the mean cell volume (MCV) of blood cells and other cell-based diagnostic techniques.

BACKGROUND

Digital holographic microscopy (DHM), also known as interference phase microscopy, is an imaging technology that provides the ability to quantitatively track sub-nanometric optical thickness changes in transparent specimens. Unlike traditional digital microscopy, in which only intensity (amplitude) information about a specimen is captured, DHM captures both phase and intensity. The phase information, captured as a hologram, can be used to reconstruct extended morphological information (such as depth and surface characteristics) about the specimen using a computer algorithm. Modern DHM implementations offer several additional benefits, such as fast scanning/data acquisition speed, low noise, high resolution and the potential for label-free sample acquisition.

Figure 1A:
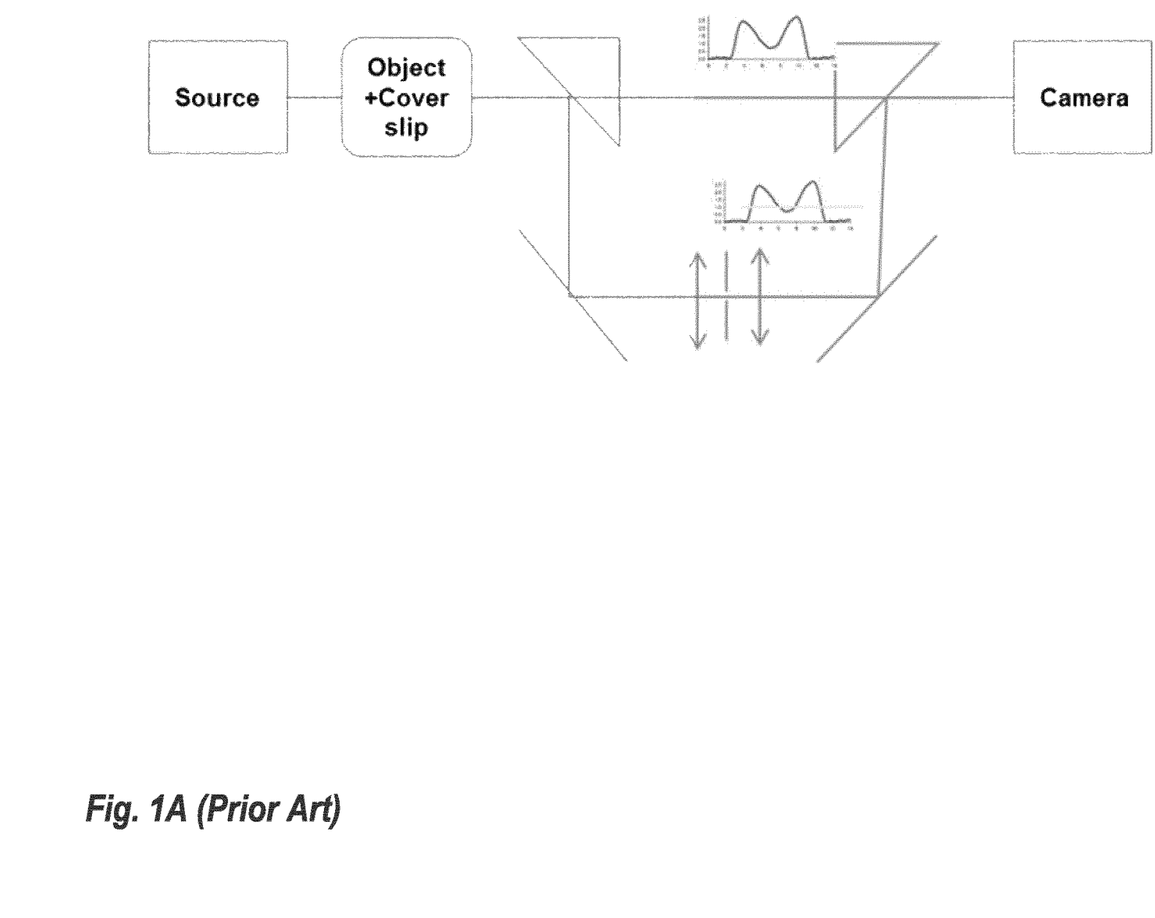
FIG. 1A shows an example schematic of off-axis digital holography system with reference beam created from the object beam.

Off-axis DHM systems create holograms where there is a modulating sinusoidal fringe pattern over the entire field of view due to small angle between object and reference beam, in other words, plane waves impinging a sensor surface interfere destructively and constructively at the location at the sensor and thus forming the sinusoidal pattern. Furthermore as depicted in the FIG. 1A, in a specific set up the reference beam is created from the object beam using a pin hole at the location of the optical Fourier-plane (or conjugated plane to the Fourier-plane) to erase the object spatial signature and to provide a uniform plane waves for creating an interference or hologram image.

Figure 1B:
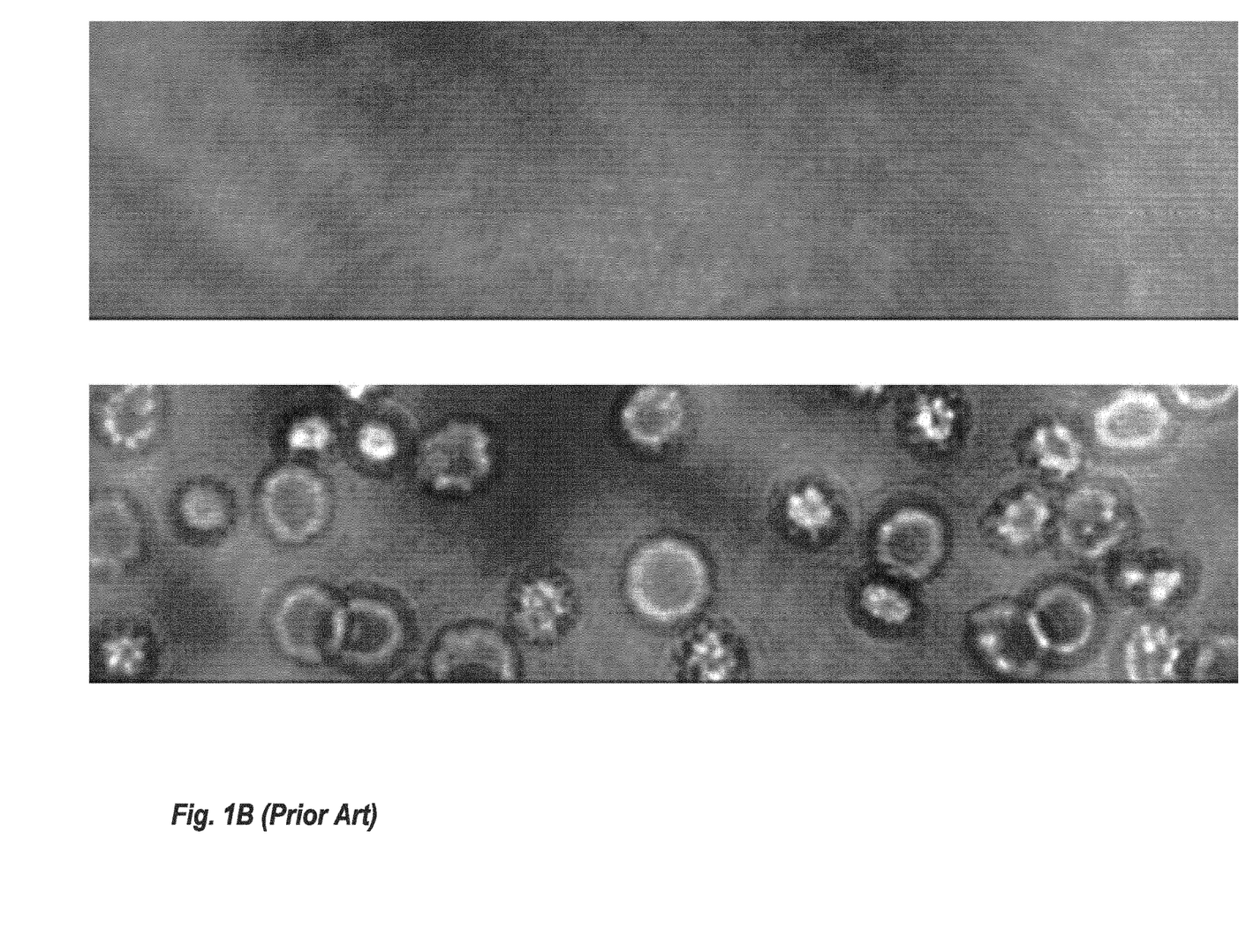
FIG. 1B shows sample reference fringe image, obtained in the absence of any objects in the plane of view and a sample object image obtained with cells in the field of view.

FIG. 1B shows sample reference fringe image, obtained in the absence of any objects in the plane of view (top) and a sample object image obtained with cells in the field of view (bottom). As shown in the FIG. 1B, the reconstruction involves a Fourier-transform based isolation of wave numbers around the modulating frequency off axis set up and finding the phase different in the corresponding waves of both an object and reference image. There will be an unwrapping step involved for cases where the optical depth difference causes absolute phase values larger than pi. The reference image in FIG. 1B is usually taken prior to the experiment or updated throughout with condition of having no object in the field of view and consistent background.

SUMMARY

Embodiments of the present invention address and overcome one or more of the above shortcomings and drawbacks, by providing methods, systems, and apparatuses related to auto-referencing in digital holographic microscopy (DHM) reconstruction. Briefly, the techniques described herein extract a reference image either from single object image or a time series of images. The regions from the object image where the fringe patterns are disturbed are extracted and those regions are replaced with patterns existing from other parts of the image.

According to some embodiments, a computer-implemented method for analyzing digital holographic microscopy (DHM) data for hematology applications includes receiving a DHM image acquired using a digital holographic microscopy system. The DHM image comprises depictions of one or more cell objects and background. A reference image is generated based on the DHM image. This reference image may then be used to reconstruct a fringe pattern in the DHM image into an optical depth map.

Various techniques may be used for generating the reference image. For example, in some embodiments, one or more regions in the DHM image where a cell object is present are detected and these regions are segmented from the DHM image. The regions of the DHM image are filled with an undisturbed fringe pattern from the background to yield a reference image, for example using compressed sensing methods or image in-painting methods (e.g., level-set based methods) based on structure and texture information included in the DHM image. In some embodiments, the regions may be automatically detected using a learning-based method. Each region may comprise, for example, a box completely surrounding each cell object. In some embodiments, a dictionary learning method is used to fill in the regions of the DHM image. For example, a dictionary of image patches may be learned that capture variability in the background. The DHM imaging may then be re-projected using the dictionary to fill in the regions. In some embodiments, sparse coding is used to generate the dictionary of image patches.

According to another aspect of the present invention, a second computer-implemented method for analyzing DHM data for hematology applications includes receiving DHM images acquired using a DHM system. The DHM images are then used to generate a reference image comprising only contributions from the background of the DHM images. For example in one embodiment, filtering algorithms are applied to dynamically estimate the reference image based on the DHM images. Once generated, the reference image is used to reconstruct a fringe pattern in the DHM image into an optical depth map. One or more visualizations may then be generated. For example, in one embodiment, a real-time visualization of one or more fringe-free reconstructed phase images is generated using the DHM images and the fringe pattern. In another embodiments, a 3-D visualization of a cell surface using the DHM images and the fringe pattern.

In some embodiments of the aforementioned second method, a previously generated reference image is updated by applying a filter to the DHM image and a predetermined number of previously received DHM images to yield a new reference image. This filter may comprise, for example, a moving average filter, a Gaussian filter, or median filter. The number of previously received DHM images used in generating the new reference image may be selected by the user or pre-set values may be used.

Additionally features may be added to the second method for analyzing DHM data discussed above. For example, in some embodiments, application of filtering algorithms comprises computing intensity statistics for each pixel region across the DHM images and selecting stable distribution values corresponding to the background from those statistics. In other embodiments, the reference image is dynamically estimated by modifying an object-free original reference image with the one or more filtering algorithms to reflect changes in imaging conditions occurring in the DHM images. In one embodiment, estimation of the reference image is triggered by switching from one patient blood sample to another with a microfluidic or spotting control unit.

According to other embodiments, a system for analyzing DHM data for hematology applications includes a DHM system, one or more processors, and a non-transitory, computer-readable storage medium in operable communication with the processors. The DHM system is configured to acquire DHM images, with each DHM image comprising depictions of one or more cell objects and background. The computer-readable storage medium comprises one or more programming instructions that, when executed, cause the processors to apply filtering algorithms to (i) dynamically generate a reference image comprising only contributions from the background of the DHM images; and (ii) use the reference image to reconstruct a fringe pattern in the DHM image into an optical depth map. The processors used in the aforementioned system may include graphical processing units (GPUs), central processing units (CPUs), or a combination of GPUs and CPUs. Additionally, individual operations performed by the processors may be divided among the various processors to optimize processing.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to the use of auto-referencing in digital holographic microscopy (DHM) reconstruction. Measuring the mean cell volume (MCV) of blood cells is an important diagnostic technique. It is essential, especially for automated detection systems using holography, that effort for maintenance and work flow is kept at a minimum. Thus, to avoid any effects of drifts, the auto-reference techniques may be applied. Such techniques are especially applicable to systems using flow cells. In order to avoid complexity it is advantageous to extract the reference hologram out of the current flow.

Figure 2:
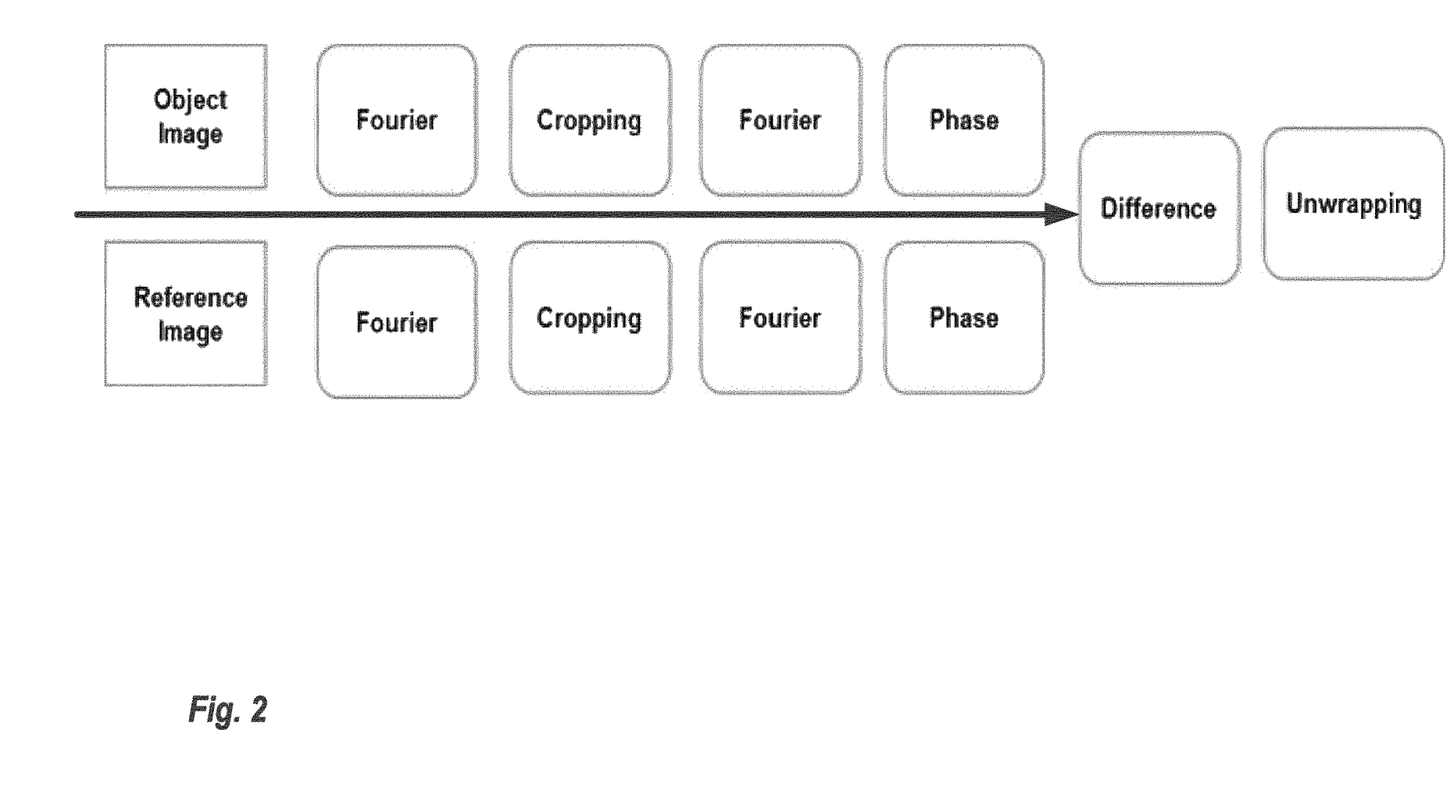
FIG. 2 shows a flowchart for DHM reconstruction, as it may applied in some embodiments.
Figure 3:
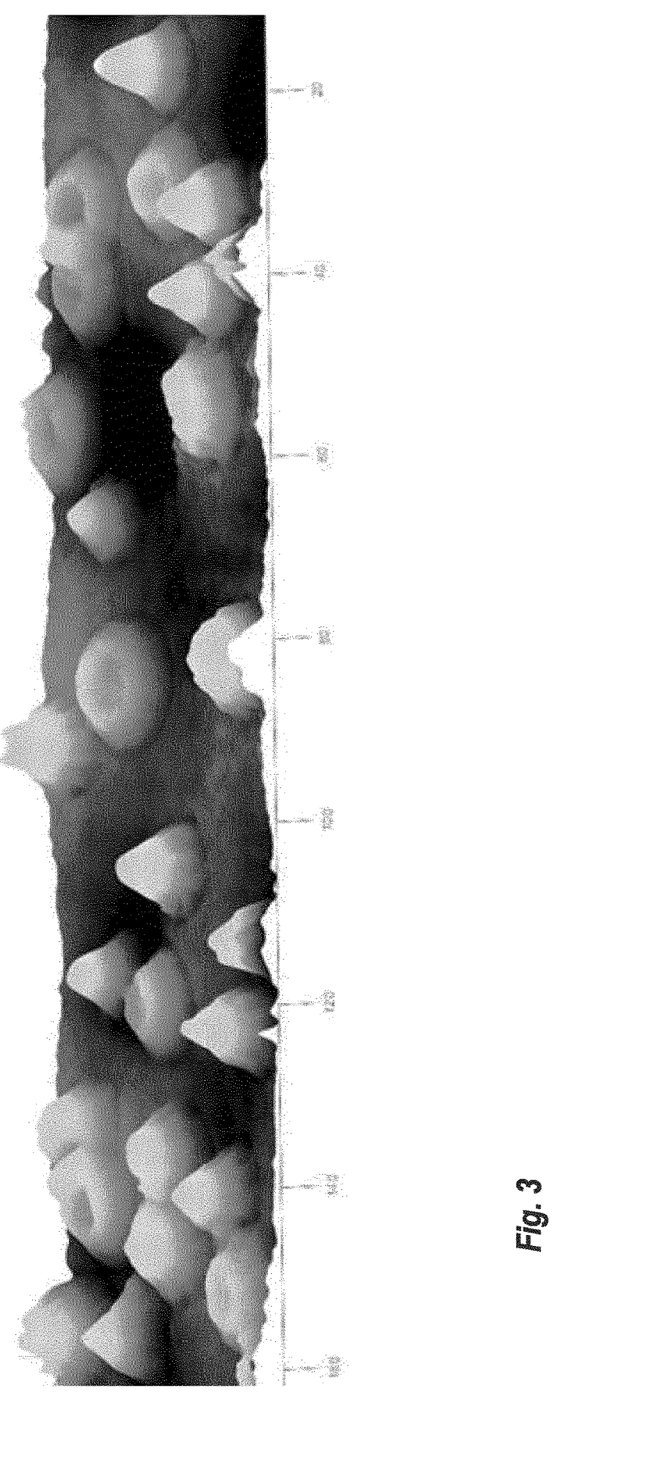
FIG. 3 shows an example reconstructed optical depth map.

FIG. 2 shows a flow chart for how a DHM reconstruction process 200 is typically performed. Reconstruction techniques such as the process 200 are generally known in the art and, thus, these techniques are only briefly described here. The process 200 utilizes an object image and a reference image which are each individually reconstruction by apply Fourier transformation to the image, cropping, applying an inverse Fourier transformation, and extracting phase information. Next, the difference between the reconstructed object image and the reconstructed reference image is calculated. Then, unwrapping is performed to yield an optical depth map. An example optical depth map is shown in FIG. 3.

Figure 4:
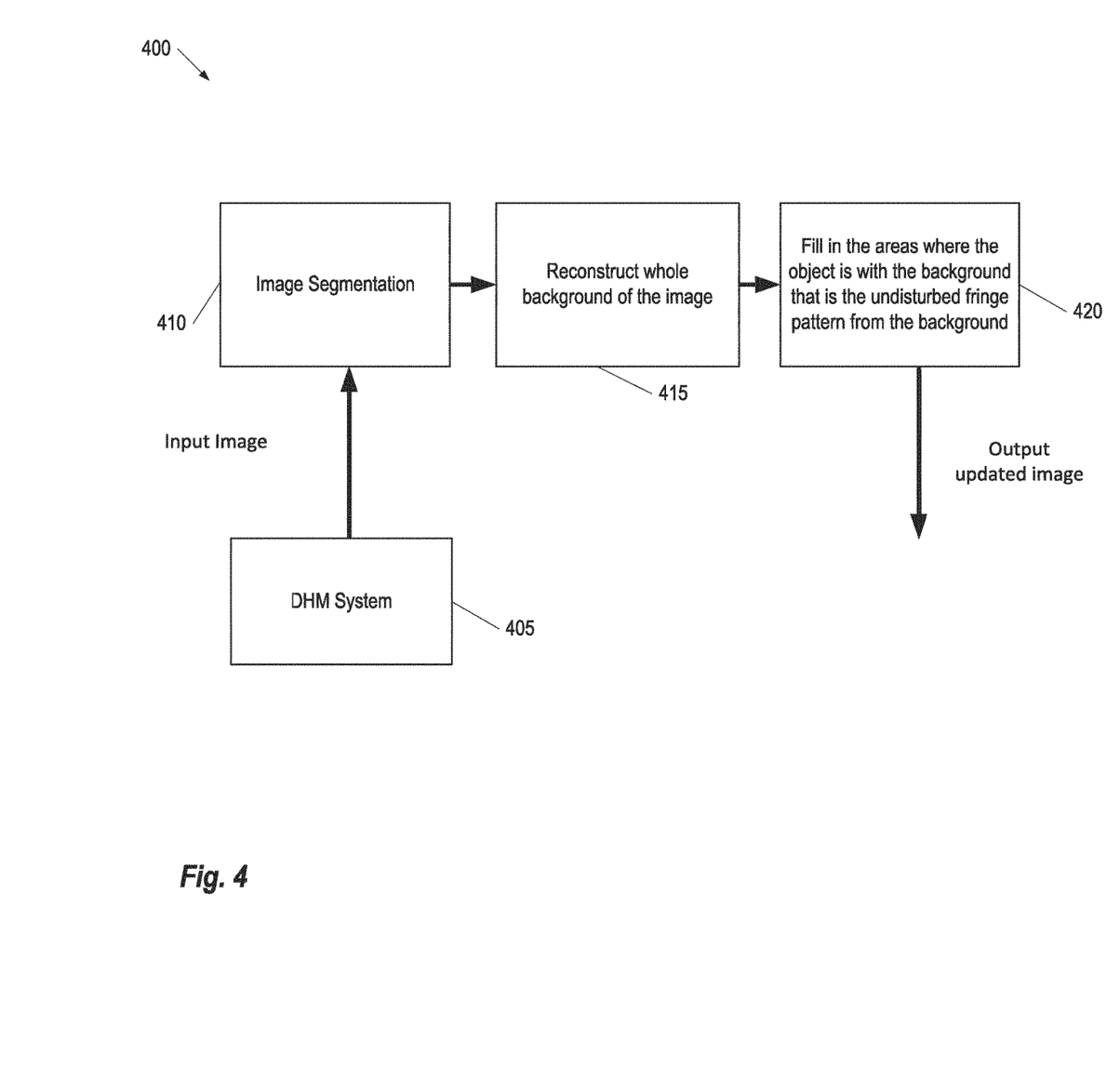
FIG. 4 illustrates a process DHM reconstruction using a reference image from a single object image, according to some embodiments.

FIG. 4 illustrates a process 400 DHM reconstruction using a reference image from a single object image, according to some embodiments. Briefly, a DHM System 405 is used to acquire one or more input images. The Digital Holographic Microscopy System 405 may be any system known in the art capable of acquiring DHM images. Various techniques may be used to preparing specimens for analysis. For example, in some embodiments, the objects can roll or slide over a substrate surface in a microfluidic channel and the microscopy is performed in transmission (using a transparent substrate, such as glass or a flexible tape) of reflection. In other embodiments, the objects can be adhered on a substrate surface (in air or in water) and the substrate is moving (e.g. glass slide or tape). Typical cellular objects have diameters in the range of 1-30 µm. Cell aggregates, such as circulating tumor cell clusters, can have diameters beyond 100 µm. Typical flow cells with preferentially laminar flow and multiple stacked flows in a rectangular flow channel (sample and e.g. bottom/top sheath flows) have typical heights of 10-1000 µm and widths of 10-10000 µm The acquired images are processed at an image segmentation step 410 to detect and segment the regions where the object is present. The detection could be performed, for example, on the raw hologram or a version of reconstruction which is done using a sub-optical reference image taken in the beginning of the experiment. The detection can be done using a learning based method and segmentation could simply be box around the object. The only requirement of step 410 is to not under-segment and to cover the entire object.

Continuing with reference to FIG. 4, the whole background of the image is reconstructed at step 415. Then, at step 420, the areas where the object is filled with the background that is the undisturbed fringe pattern from the background. As the background pattern includes fringe pattern, it is relatively straight forward to use dictionary learning or compressed sensing methods to reconstruct the whole background. A dictionary learning method would learn a dictionary of image patches that capture the background variability and re-project the entire images using the learnt dictionary to fill in the specific areas. In some embodiments, sparse coding algorithms are used to generate the image patch dictionaries and look-up patches within the dictionary. In some embodiments, a multi-resolution image patch to capture the background fringe patterns and re-project the disturbed image pattern to closed non-disturbed background version. As an alternative to the dictionary-based technique, image in-painting methods can be used to fill in the missing background regions based on both the structure and texture of the data. For instance, level-set based methods provide an alternative means of in-painting images.

Several techniques may be used to extend the process 400 illustrated in FIG. 4 to a time series of object images. In some embodiments, for each frame of the time series, a detection and segmentation is performed as described above with reference to FIG. 4. With an assumption that the object regions do not coincide in the same area of the image, we perform a weighted average is performed in order to create a single reference frame using background areas of all the frames with the time series. Any missing regions can be filled in with the methods outlined above with respect to steps 415 and 420.

In some embodiments, reference images can be optionally taken or combined by switching of the fluidic conditions which includes pushing the cells out of the field of view by means of sheath flows. Alternatively, instead of continuous recording of reference images one can trigger the recording of reference images by for instance switching from one patient blood sample to another with a microfluidic or spotting control unit. In some embodiments, thresholds of the reference signal to noise ratio can be applied as internal quality control indicating for instance contamination of the flow channel.

In some embodiments, the user need not update the reference image for every image, or every consecutive set of images. Instead, the user can choose to reconstruct the reference image once every N DHM object images (e.g., every 100 images) using the most recently computed reference image for calculations. That may be especially useful if the imaging speed is very fast (many frames every second) and the conditions do not rapidly change.

Under conditions where the reference image is expected to change slowly over the course of acquisition, many different filtering algorithms can be used to dynamically estimate the current reference image without requiring object segmentation. In some embodiments, the intensity statistics are computed for each pixel or pixel region across the frames and select stable distribution values which correspond to the background. Since again the object appearance in certain region of image is less prevalent than the background pattern, robust estimates may be computed through probability density function computation and the less probable events can be replaced with the mean, median, or the first mode of estimated probability density function.

Another option is by using any of a wide variety of filtering functions to update a continuously evolving reference image. As one example, using the average filter with a history of K previous frames, the reference image is continuously updated as each new frame arrives. This may introduce a small incremental cost of updating the reference image, but eliminates the periodic acquisition of reference images. There are myriad choices for the filter used for computing the reference, including median over K frames, moving average filter, Gaussian filter, etc.

Another approach is to learn a sparse representation in Fourier space. Since the reference image contains only limited information, its representation in Fourier space is expected to be sparse. So, the process 400 illustrated in FIG. 4 would be modified to train a machine learning model to map object images in Fourier space to the corresponding Fourier representation of the reference image. Once trained over a sufficiently large sample of known training data, the learnt model can be used nearly instantaneously to compute a reference image from the given object images.

With recent developments in computer architecture, the cost of memory has become almost negligible. For the different algorithms specified above, one can save all previous frames required for the computations in memory to speed up the computations. Further, it is possible to use Graphical Processing Units and/or computational co-processors such as Intel's Xeon Phi™ or NVIDIA CUDA™ to greatly accelerate the computations.

The techniques could also be adapted to applications which involve capturing images with multiple wavelengths of light. As an example, in some embodiments, multiple reference images are computed, one corresponding to each distinct wavelength being used. Then the different reconstructed images, along with prior knowledge of the dependence of the refractive index of the objects on the wavelength of light, can be used for an accurate reconstruction. Other examples include using prior knowledge on refractive index dependence on wavelength implicitly, to set up a coupled system of equations, or to solve it as an optimization problem.

Figure 5A:
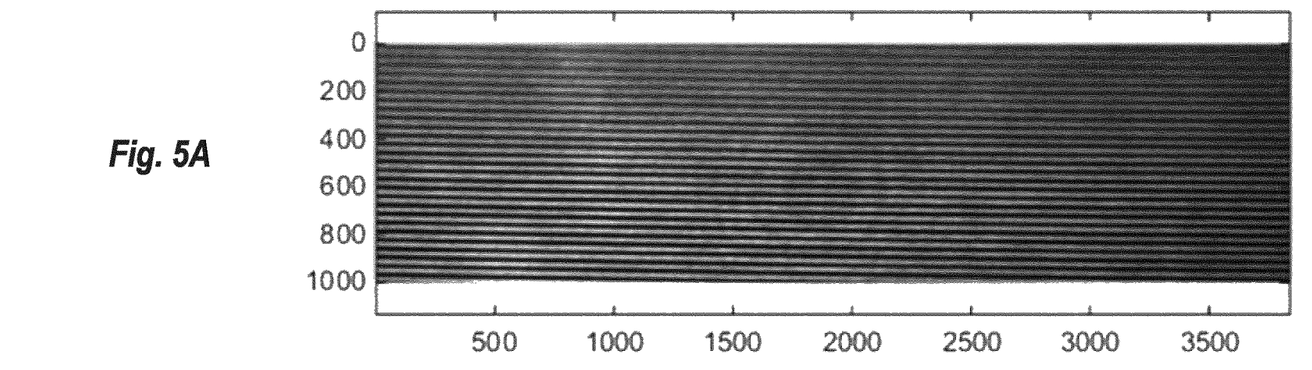
FIG. 5A shows an example reference image computed with a stack size of 30 object images using median filtering.
Figure 5B:
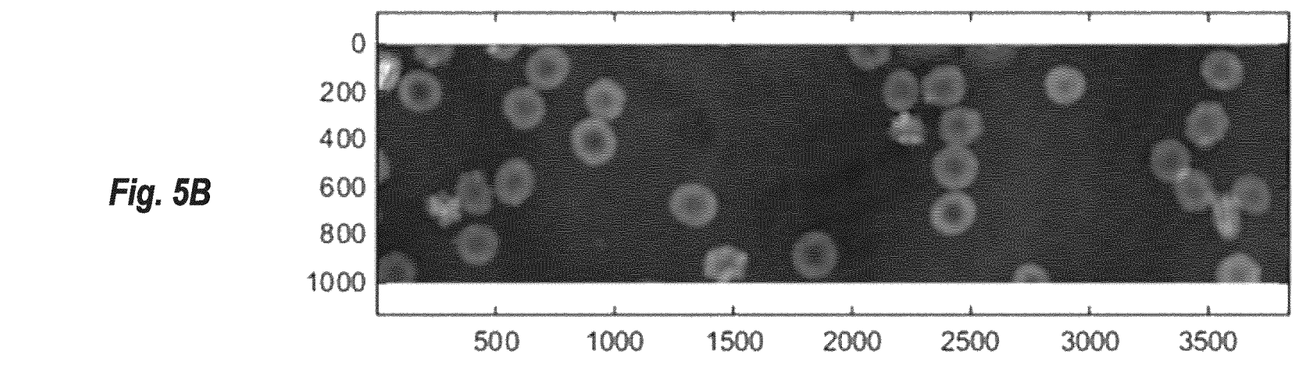
FIG. 5B shows a reconstructed object image using the computed reference image.
Figure 6:
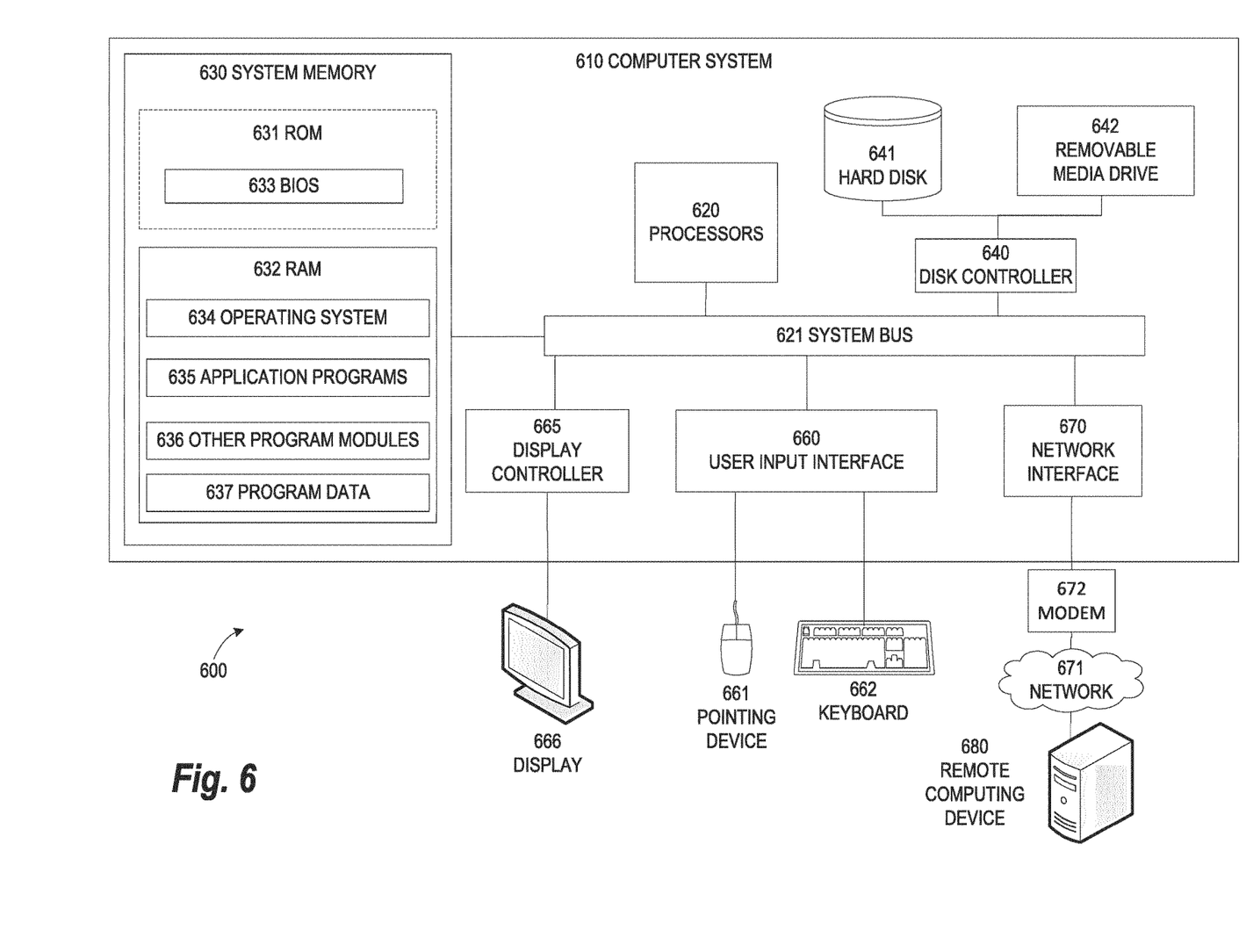
FIG. 6 illustrates an exemplary computing environment within which embodiments of the invention may be implemented.

As an example of the applicability of the techniques described herein, FIGS. 5A and 5B present initial results obtained using the auto-reference algorithm on an existing set of DHM imaging experiments. For this example, a stack of 3840×1000 size images was used and the reference image was computed using a median filtering approach. FIG. 5A shows the reference image, while FIG. 5B shows the reconstructed object image. As shown in these figures, the reconstruction is free of artifacts FIG. 6 illustrates an exemplary computing environment 600 within which embodiments of the invention may be implemented. For example, this computing environment 600 may be configured to execute one or more of the components of the process 400 illustrated in FIG. 4. The computing environment 600 may include computer system 610, which is one example of a computing system upon which embodiments of the invention may be implemented. Computers and computing environments, such as computer system 610 and computing environment 600, are known to those of skill in the art and thus are described briefly here.

As shown in FIG. 6, the computer system 610 may include a communication mechanism such as a bus 621 or other communication mechanism for communicating information within the computer system 610. The computer system 610 further includes one or more processors 620 coupled with the bus 621 for processing the information. The processors 620 may include one or more central processing units (CPUs), graphical processing units (GPUs), or any other processor known in the art.

The computer system 610 also includes a system memory 630 coupled to the bus 621 for storing information and instructions to be executed by processors 620. The system memory 630 may include computer readable storage media in the form of volatile and/or nonvolatile memory, such as read only memory (ROM) 631 and/or random access memory (RAM) 632. The system memory RAM 632 may include other dynamic storage device(s) (e.g., dynamic RAM, static RAM, and synchronous DRAM). The system memory ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system (BIOS) 633 containing the basic routines that help to transfer information between elements within computer system 610, such as during start-up, may be stored in ROM 631. RAM 632 may contain data and/or program modules that are immediately accessible to and/or presently being operated on by the processors 620. System memory 630 may additionally include, for example, operating system 634, application programs 635, other program modules 636 and program data 637.

The computer system 610 also includes a disk controller 640 coupled to the bus 621 to control one or more storage devices for storing information and instructions, such as a hard disk 641 and a removable media drive 642 (e.g., floppy disk drive, compact disc drive, tape drive, and/or solid state drive). The storage devices may be added to the computer system 610 using an appropriate device interface (e.g., a small computer system interface (SCSI), integrated device electronics (IDE), Universal Serial Bus (USB), or FireWire).

The computer system 610 may also include a display controller 665 coupled to the bus 621 to control a display 666, such as a cathode ray tube (CRT) or liquid crystal display (LCD), for displaying information to a computer user. The computer system includes an input interface 660 and one or more input devices, such as a keyboard 662 and a pointing device 661, for interacting with a computer user and providing information to the processor 620. The pointing device 661, for example, may be a mouse, a trackball, or a pointing stick for communicating direction information and command selections to the processor 620 and for controlling cursor movement on the display 666. The display 666 may provide a touch screen interface which allows input to supplement or replace the communication of direction information and command selections by the pointing device 661.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium, such as a hard disk 641 or a removable media drive 642. The hard disk 641 may contain one or more datastores and data files used by embodiments of the present invention. Datastore contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processor 620 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 641 or removable media drive 642. Non-limiting examples of volatile media include dynamic memory, such as system memory 630. Non-limiting examples of transmission media include coaxial cables, copper wire, and fiber optics, including the wires that make up the bus 621. Transmission media may also take the form of acoustic or light waves, such as those generated during radio wave and infrared data communications.

The computing environment 600 may further include the computer system 610 operating in a networked environment using logical connections to one or more remote computers, such as remote computer 680. Remote computer 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computer 680). The network 671 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

As one application of the exemplary computing environment 600 to the technology described herein, consider an example system for analyzing DHM data which includes a network component, an image processing processor, and a GUI. The networking component may include network interface 670 or some combination of hardware and software offering similar functionality. The networking component is configured to communicate with a DHM system to retrieve DHM images. Thus, in some embodiments, the networking component may include a specialized interface for communicating with DHM systems. The image processing processor is included in a computing system (e.g. computer system 610) and is configured with instructions that enable to extract a reference image either from single object image or a time series of images received via the networking component, extract the regions from the object image where the fringe patterns are disturbed, and replace those regions with patterns existing from other parts of the image. The image processing processor may include additional functionality, as described in this disclosure, to support this task (e.g., segmentation, filling areas, etc.). The GUI may then be presented on a display (e.g., display 666) for review by a user.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A computer-implemented method for analyzing digital holographic microscopy (DHM) data for hematology applications, the method comprising:
receiving a plurality of DHM images acquired using a digital holographic microscopy system, each DHM image comprising depictions of one or more cell objects and background;
generating a reference image based on the plurality of DHM images comprising only contributions from the background of the plurality of DHM images;
using the reference image to reconstruct a fringe pattern in the DHM image into an optical depth map,
wherein the reference image is generated by:
applying one or more filtering algorithms to dynamically estimate the reference image,
wherein applying the one or more filtering algorithms comprises:
computing intensity statistics for each pixel region across the plurality of DHM images;
selecting stable distribution values corresponding to the background from the intensity statistics.

2. The method of claim 1, wherein the plurality of DHM images are received in succession and the one or more filtering algorithms are applied to each DHM image by: updating a previously generated reference image by applying a filter to the DHM image and a predetermined number of previously received DHM images to yield a new reference image.

3. The method of claim 2, wherein the filter comprises a moving average filter.

4. The method of claim 2, wherein the filter comprises a Gaussian filter.

5. The method of claim 2, wherein the filter comprises a median filter.

6. The method of claim 2, wherein the predetermined number of previously received DHM images is selected by a user.

7. The method of claim 1, further comprising:
receiving an object-free original reference image,
wherein the reference image is generated by modifying the object-free original reference image to reflect changes in imaging conditions occurring in the plurality of DHM images.

8. The method of claim 1, wherein generating of the reference image is triggered by switching from one patient blood sample to another with a microfluidic or spotting control unit.

9. The method of claim 1, wherein the reference image is generated at user-specified time intervals and reconstruction of the fringe pattern in the DHM image into the optical depth map is performed using a most recently computed reference image.

10. The method of claim 1, further comprising:
generating a real-time visualization of one or more fringe-free reconstructed phase images using the plurality of DHM images and the fringe pattern.

11. The method of claim 1, further comprising:
generating a 3-D visualization of a cell surface using the plurality of DHM images and the fringe pattern.

12. A system for analyzing digital holographic microscopy (DHM) data for hematology applications, the system comprising:
a DHM system configured to acquire a plurality of DHM images, each DHM image comprising depictions of one or more cell objects and background;
one or more processors;
a non-transitory, computer-readable storage medium in operable communication with the processors, wherein the computer-readable storage medium comprises one or more programming instructions that, when executed, cause the processors to:
    generate a reference image comprising only contributions from the background of the plurality of DHM images; and
    use the reference image to reconstruct a fringe pattern in the DHM image into an optical depth map,
    wherein the reference image is generated by:
        applying one or more filtering algorithms to dynamically estimate the reference image,
    wherein applying the one or more filtering algorithms comprises:
        computing intensity statistics for each pixel region across the plurality of DHM images; and
        selecting stable distribution values corresponding to the background from the intensity statistics.

13. The system of claim 12, wherein the one or more processors comprise a plurality of graphical processing units.

14. The system of claim 12, wherein the one or more processors further comprise a plurality of central processing units.

\* \* \* \* \*